United States Patent
Liu et al.

(10) Patent No.: US 11,283,544 B2
(45) Date of Patent: Mar. 22, 2022

(54) QR DECOMPOSITION-BASED DETECTION METHOD AND APPARATUS

(71) Applicant: SHEN ZHEN KUANG-CHI HEZHONG TECHNOLOGY LTD., Shenzhen (CN)

(72) Inventors: Ruopeng Liu, Shenzhen (CN); Chunlin Ji, Shenzhen (CN); Lin You, Shenzhen (CN)

(73) Assignee: SHEN ZHEN KUANG-CHI HEZHONG TECHNOLOGY LTD., Shenzhen (CN)

( * ) Notice: Subject to any disclaimer, the term of this patent is extended or adjusted under 35 U.S.C. 154(b) by 84 days.

(21) Appl. No.: 16/703,213

(22) Filed: Dec. 4, 2019

(65) Prior Publication Data

US 2020/0106553 A1   Apr. 2, 2020

Related U.S. Application Data

(63) Continuation of application No. PCT/CN2018/079733, filed on Mar. 21, 2018.

(30) Foreign Application Priority Data

Dec. 29, 2017 (CN) .......................... 201711483905.9

(51) Int. Cl.
*H04L 1/00* (2006.01)
*H04J 99/00* (2009.01)

(52) U.S. Cl.
CPC ............ *H04L 1/0052* (2013.01); *H04J 15/00* (2013.01)

(58) Field of Classification Search
CPC ..................... H04L 1/0052; H04L 25/03343
See application file for complete search history.

(56) References Cited

U.S. PATENT DOCUMENTS 8,903,027 B1 * 12/2014 Wu .................. H04L 25/03318
                                                    375/341

FOREIGN PATENT DOCUMENTS

CN   101001092 A   7/2007
CN   102111243 A   6/2011
(Continued)

OTHER PUBLICATIONS

Jin et al. (Decoding OvTDM with sphere-decoding algorithm), Dec. 2008, ScienceDirect, 15(4): 35-39, 5 pages. (Year: 2008).*
(Continued)

*Primary Examiner* — Hoon J Chung
(74) *Attorney, Agent, or Firm* — Cantor Colburn LLP (57) ABSTRACT

Provided are a QR decomposition-based detection method and apparatus based on overlapped multiplexing. The QR decomposition-based detection method includes: step S1: obtaining a receive sequence, where the receive sequence is a sequence obtained by encoding and modulating an input signal based on a multiplexing waveform matrix and transmitting the signal through a Gaussian channel; and step S2: detecting the receive sequence by using a QR decomposition algorithm, where step S2 includes: decomposing a foreknown multiplexing waveform matrix into a unitary matrix and an upper triangular matrix; performing matrix multiplication processing on the receive sequence based on the unitary matrix, to obtain a data sequence; and performing layer-by-layer detection on the data sequence based on the data sequence, the upper triangular matrix, and a quantized decision factor.

6 Claims, 5 Drawing Sheets

(56) References Cited

FOREIGN PATENT DOCUMENTS

| CN | 102315872 A | 1/2012 |
|---|---|---|
| CN | 103795503 A | 5/2014 |
| EP | 2242197 A1 | 10/2010 |
| EP | 2804332 A1 | 11/2014 |
| EP | 3001625 A1 | 3/2016 |

OTHER PUBLICATIONS

Vandenberghe, "6. QR factorization", 2016, https://web.archive.org/web/20161020052349/http://www.seas.ucla.edu/~vandenbe/133A/lectures/qr.pdf, 42 pages. (Year: 2016).*

International Search Report for corresponding application PCT/CN2018/079733 filed Mar. 3, 2018; dated Sep. 29, 2018.

Babak Hassibi, "On the Sphere-Decoding Algorithm I. Expected Complexity", IEE Transactions on Signal Processing, vol. 53, No. 8 Aug. 2005.

European Search Report for corresponding application EP18 89 6226; dated Nov. 20, 2020.

Jin Xin, "Decoding OvTDM with sphere-decoding algorithm", The Journal of China Universities of Posts and Telecommunications, Dec. 2008, 15(4): 35-39, www.sciencedirect.com/science/journal/10058885.

* cited by examiner

$$a_0x_0 \quad a_1x_0 \quad a_2x_0 \quad \ldots \quad a_{k-1}x_0$$
$$a_0x_1 \quad a_1x_1 \quad a_2x_1 \quad \ldots \quad a_{k-1}x_1$$
$$a_0x_2 \quad a_1x_2 \quad a_2x_2 \quad \ldots \quad a_{k-1}x_2$$
$$\ldots$$
$$a_0x_{k-1} \quad a_1x_{k-1} \quad a_2x_{k-1} \quad \ldots \quad a_{k-1}x_{k-1}$$

$$A_0X_0 \quad A_1X_0 \quad A_2X_0 \quad ... \quad A_{k-1}X_0$$
$$A_0X_1 \quad A_1X_1 \quad A_2X_1 \quad ... \quad A_{k-1}X_1$$
$$A_0X_2 \quad A_1X_2 \quad A_2X_2 \quad ... \quad A_{k-1}X_2$$
$$...$$
$$A_0X_{k-1} \quad A_1X_{k-1} \quad A_2X_{k-1} \quad ... \quad A_{k-1}X_{k-1}$$

FIG. 9

QR DECOMPOSITION-BASED DETECTION METHOD AND APPARATUS

CROSS REFERENCE TO RELATED APPLICATIONS

This application is a continuation of International Patent Application Number PCT/CN2018/079733 filed on Mar. 21, 2018, which claims priority to Chinese Patent Application Number 201711483905.9 filed on Dec. 29, 2017, whereby the entire contents of both of said applications are incorporated herein by reference.

TECHNICAL FIELD

The present disclosure relates to the communications field, and specifically, to a QR decomposition-based detection method and apparatus.

BACKGROUND

In an overlapped multiplexing system (OvXDM system, where X may represent time T, frequency F, code C, space S, hybrid H, or the like), common decoding methods include Viterbi decoding and the like. The decoding methods are based on graphics decoding, and complexity is affected by a quantity of states. Therefore, for the overlapped multiplexing system, when a quantity K of times of overlapped multiplexing is relatively large, decoding complexity increases exponentially, and a relatively large storage capacity is required, so that implementation in actual engineering is relatively difficult.

For the problem in the prior art, no effective solution is currently proposed.

SUMMARY

For the problem in the prior art, the present disclosure provides a QR decomposition-based detection method and apparatus, where the QR decomposition-based detection method and apparatus are applied to an overlapped multiplexing system.

The technical solutions in the present disclosure are implemented as follows:

According to an aspect of the present disclosure, a QR decomposition-based detection method is provided.

The QR decomposition-based detection method includes: step S1: obtaining a receive sequence, where the receive sequence is a sequence obtained by encoding and modulating an input signal based on a multiplexing waveform matrix and transmitting the signal through a Gaussian channel; and step S2: detecting the receive sequence by using a QR decomposition algorithm, where step S2 includes: decomposing a foreknown multiplexing waveform matrix into a unitary matrix and an upper triangular matrix; performing matrix multiplication processing on the receive sequence based on the unitary matrix, to obtain a data sequence; and performing layer-by-layer detection on the data sequence based on the data sequence, the upper triangular matrix, and a quantized decision factor.

According to an embodiment of the present disclosure, the QR decomposition-based detection method further includes: obtaining the receive sequence, where the receive sequence is as follows:

$$r = HX + \eta,$$

where r indicates the receive sequence, H indicates the multiplexing waveform matrix, X indicates a to-be-sent sequence, and $\eta$ indicates a Gaussian white noise sequence; and performing matrix multiplication processing on the receive sequence based on the unitary matrix, to obtain the data sequence, where the data sequence is as follows:

$$y = RX + \eta',$$

where y indicates the data sequence, R indicates the upper triangular matrix, and $\eta'$ indicates a Gaussian white noise sequence.

According to an embodiment of the present disclosure, the performing layer-by-layer detection on the data sequence based on the data sequence, the upper triangular matrix, and a quantized decision factor includes: defining a plurality of elements $y_1, y_2, \ldots,$ and $y_L$ in the data sequence as multi-layer elements $y_1, y_2, \ldots,$ and $y_L$; obtaining a decision value of the bottom-layer element $y_L$ based on the bottom-layer element $y_L$, the upper triangular matrix, and the quantized decision factor; and sequentially obtaining decision values of non-bottom-layer elements $y_M, y_{M-1}, \ldots,$ and $y_1$ based on the non-bottom-layer elements $y_M, y_{M-1}, \ldots,$ and $y_1$, the upper triangular matrix, and the quantized decision factor, where M is less than L, and both L and M are positive integers.

According to an embodiment of the present disclosure, the decision value of the bottom-layer element $y_L$ is as follows:

$$\hat{x}_L = Q\left(\frac{y_L}{R_{L,L}}\right),$$

where $$Q\left(\frac{y_L}{R_{L,L}}\right)$$

indicates the quantized decision factor, $\hat{x}_L$ indicates the decision value of the bottom-layer element $y_L$, and $R_{L,L}$ indicates an element in a row L and a column L of the upper triangular matrix.

According to an embodiment of the present disclosure, a decision value of any non-bottom-layer element is as follows:

$$\hat{x}_k = Q\left(\frac{y_k - \sum_{j=k+1}^{L} R_{k,j} \cdot \hat{x}_j}{R_{k,k}}\right),$$

where $$Q\left(\frac{y_k - \sum_{j=k+1}^{L} R_{k,j} \cdot \hat{x}_j}{R_{k,k}}\right)$$

indicates the quantized decision factor, $\hat{x}_k$ indicates the decision value of any non-bottom-layer element $y_k$, $R_{k,k}$ indicates an element in a row k and a column k of the upper triangular matrix, $R_{k,j}$ indicates an element in the row k and a column j of the upper triangular matrix, $\hat{x}_j$ indicates a decision value corresponding to an element $y_j$, and k=1, 2, ..., L−1.

According to another aspect of the present disclosure, a QR decomposition-based detection apparatus is provided.

The QR decomposition-based detection apparatus includes: a first acquiring module, configured to: obtain a receive sequence, where the receive sequence is a sequence obtained by encoding and modulating an input signal based on a multiplexing waveform matrix and transmitting the signal through a Gaussian channel; and a detection module, configured to: detect the receive sequence by using a QR decomposition algorithm, where the detection module includes: a decomposition module, configured to: decompose a foreknown multiplexing waveform matrix into a unitary matrix and an upper triangular matrix; a first obtaining module, configured to: perform matrix multiplication processing on the receive sequence based on the unitary matrix, to obtain a data sequence; and a layer-by-layer detection module, configured to: perform layer-by-layer detection on the data sequence based on the data sequence, the upper triangular matrix, and a quantized decision factor.

According to an embodiment of the present disclosure, the QR decomposition-based detection apparatus further includes: a second acquiring module, configured to: obtain the receive sequence, where the receive sequence is as follows: r=HX+η, where r indicates the receive sequence, H indicates the multiplexing waveform matrix, X indicates a to-be-sent sequence, and η indicates a Gaussian white noise sequence; and an obtaining submodule, configured to: perform matrix multiplication processing on the receive sequence based on the unitary matrix, to obtain the data sequence, where the data sequence is as follows:

$y=RX+\eta'$, where y indicates the data sequence, R indicates the upper triangular matrix, and η' indicates a Gaussian white noise sequence.

According to an embodiment of the present disclosure, the layer-by-layer detection module includes: a definition module, configured to: define a plurality of elements $y_1$, $y_2$, ..., and $y_L$ in the data sequence as multi-layer elements $y_1$, $y_2$, ..., and $y_L$; a second obtaining module, configured to: obtain a decision value of the bottom-layer element $y_L$ based on the bottom-layer element $y_L$, the upper triangular matrix, and the quantized decision factor; and a third obtaining module, configured to: sequentially obtain decision values of non-bottom-layer elements $y_M$, $y_{M-1}$, ..., and $y_1$ based on the non-bottom-layer elements $y_M$, $y_{M-1}$, ..., and $y_1$, the upper triangular matrix, and the quantized decision factor, where M is less than L, and both L and M are positive integers.

According to an embodiment of the present disclosure, the decision value of the bottom-layer element $y_L$ is as follows:

$$\hat{x}_L = Q\left(\frac{y_L}{R_{L,L}}\right),$$

where $$Q\left(\frac{y_L}{R_{L,L}}\right)$$

indicates the quantized decision factor, $\hat{x}_L$ indicates the decision value of the bottom-layer element $y_L$, and $R_{L,L}$ indicates an element in a row L and a column L of the upper triangular matrix.

According to an embodiment of the present disclosure, a decision value of any non-bottom-layer element is as follows:

$$\hat{x}_k = Q\left(\frac{y_k - \sum_{j=k+1}^{L} R_{k,j} \cdot \hat{x}_j}{R_{k,k}}\right),$$

where $$Q\left(\frac{y_k - \sum_{j=k+1}^{L} R_{k,j} \cdot \hat{x}_j}{R_{k,k}}\right)$$

indicates the quantized decision factor, $\hat{x}_k$ indicates the decision value of any non-bottom-layer element $y_k$, $R_{k,k}$ indicates an element in a row k and a column k of the upper triangular matrix, $R_{k,j}$ indicates an element in the row k and a column j of the upper triangular matrix, $\hat{x}_j$ indicates a decision value corresponding to an element $y_j$, and k=1, 2, ..., L−1.

A beneficial technical effect of the present disclosure lies in:

In the present disclosure, transmission data is correspondingly decoded by using encoding characteristics of the overlapped multiplexing system and with reference to a QR decomposition-based detection method in a multiple-antenna system, thereby resolving problems in traditional decoding methods such as Viterbi, MAP, and Log-MAP decoding methods that a calculation amount is relatively large, complexity is relatively high, a relatively large storage capacity is required, and engineering implementation is difficult, and reducing decoding complexity of the OvXDM system.

BRIEF DESCRIPTION OF DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure shall fall within the protection scope of the present disclosure.

According to an embodiment of the present disclosure, a QR decomposition-based detection method is provided. The QR decomposition-based detection method is applied to an overlapped multiplexing system.

Figure 1:
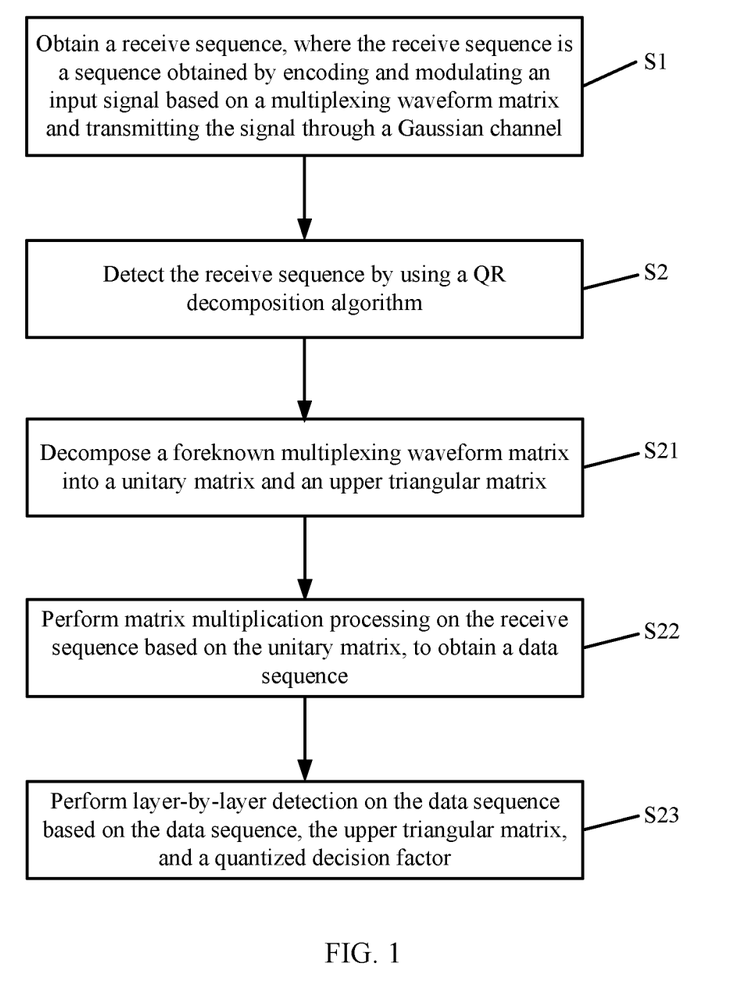
FIG. 1 is a flowchart of an optional QR decomposition-based detection method according to an embodiment of the present disclosure.

As shown in FIG. 1, the QR decomposition-based detection method according to this embodiment of the present disclosure includes the following steps: Step S1: Obtain a receive sequence, where the receive sequence is a sequence obtained by encoding and modulating an input signal based on a multiplexing waveform matrix and transmitting the signal through a Gaussian channel. Step S2: Detect the receive sequence by using a QR decomposition algorithm. Step S2 includes the following steps: Step S21: Decompose a foreknown multiplexing waveform matrix into a unitary matrix and an upper triangular matrix. Step S22: Perform matrix multiplication processing on the receive sequence based on the unitary matrix, to obtain a data sequence. Step S23: Perform layer-by-layer detection on the data sequence based on the data sequence, the upper triangular matrix, and a quantized decision factor.

According to the foregoing different technical features, transmission data is correspondingly decoded by using encoding characteristics of the overlapped multiplexing system and with reference to a QR decomposition-based detection method in a multiple-antenna system, thereby resolving problems in traditional decoding methods such as Viterbi, MAP, and Log-MAP decoding methods that a calculation amount is relatively large, complexity is relatively high, a relatively large storage capacity is required, and engineering implementation is difficult, and reducing decoding complexity of the OvXDM system.

To better describe the present disclosure, the following describes the foregoing technical solutions in detail by using specific embodiments.

Figure 2:
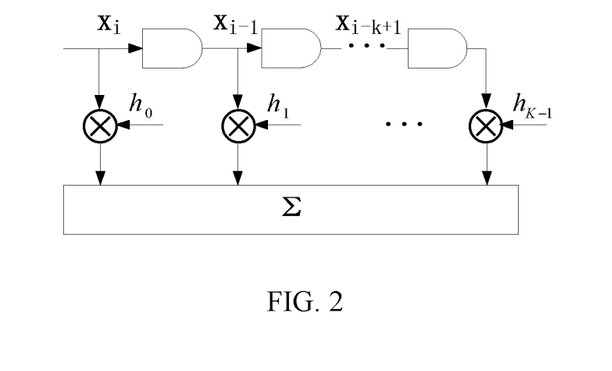
FIG. 2 is a schematic diagram of an optional equivalent convolutional coding model of an overlapped multiplexing system according to an embodiment of the present disclosure.

The technical solutions in the present disclosure are applicable to an overlapped multiplexing system. The overlapped multiplexing system may be an overlapped time division multiplexing (OvTDM) system, an overlapped frequency division multiplexing (OvFDM) system, an overlapped code division multiplexing (OvCDM) system, an overlapped space division multiplexing (OvSDM) system, an overlapped hybrid division multiplexing (OvHDM) system, or the like. An equivalent system model thereof is shown in FIG. 2. To better describe the technical solutions in the present disclosure, the following gives description by using the overlapped multiplexing system as an example.

In addition, according to system characteristics of the overlapped multiplexing system, first, it is assumed that an overlapped multiplexing coefficient is K, and tap coefficients of a multiplexing waveform are defined as $[h_0, h_1, \ldots, h_{K-1}]$. In this case, according to convolution characteristics of an overlapped multiplexing relationship, assuming that a length of a real information bit sequence is L, and a bit sequence obtained after encoding in the overlapped multiplexing system is N, where N=L+K−1, a multiplexing waveform H may be represented in a matrix form as follows:

$$H = \begin{bmatrix} h_0 & 0 & \cdots & \cdots & \cdots & 0 \\ h_1 & h_0 & \ddots & \ddots & \ddots & \vdots \\ \vdots & h_1 & \ddots & \ddots & \ddots & \vdots \\ h_{K-1} & \vdots & \ddots & \ddots & \ddots & \vdots \\ 0 & h_{K-1} & \ddots & \ddots & \ddots & 0 \\ \vdots & 0 & \ddots & \ddots & \ddots & h_0 \\ \vdots & \vdots & 0 & \ddots & \ddots & h_1 \\ \vdots & \vdots & \ddots & 0 & \ddots & \vdots \\ 0 & 0 & \cdots & \cdots & 0 & h_{K-1} \end{bmatrix},$$

where a size of the multiplexing waveform matrix is N×L.

In addition, assuming that an output vector obtained after encoding in the overlapped multiplexing system is $Y=[y_0, \ldots, y_{N-1}]^T$, and an input vector is $X=[x_1, \ldots, x_{L-1}]^T$, an encoding process of the overlapped multiplexing system may be expressed as Y=HX, that is:

$$\begin{bmatrix} y_0 \\ y_1 \\ \vdots \\ y_{N-1} \end{bmatrix} = \begin{bmatrix} h_0 & 0 & \cdots & \cdots & \cdots & 0 \\ h_1 & h_0 & \ddots & \ddots & \ddots & \vdots \\ \vdots & h_1 & \ddots & \ddots & \ddots & \vdots \\ h_{K-1} & \vdots & \ddots & \ddots & \ddots & \vdots \\ 0 & h_{K-1} & \ddots & \ddots & \ddots & 0 \\ \vdots & 0 & \ddots & \ddots & \ddots & h_0 \\ \vdots & \vdots & 0 & \ddots & \ddots & h_1 \\ \vdots & \vdots & \ddots & 0 & \ddots & \vdots \\ 0 & 0 & \cdots & \cdots & 0 & h_{K-1} \end{bmatrix} \cdot \begin{bmatrix} x_0 \\ x_1 \\ \vdots \\ x_{L-1} \end{bmatrix}$$

In this case, a receive sequence r may be expressed as follows:

$$r = \begin{bmatrix} r_0 \\ r_1 \\ \vdots \\ r_{N-1} \end{bmatrix} = \begin{bmatrix} y_0 \\ y_1 \\ \vdots \\ y_{N-1} \end{bmatrix} +$$

$$\begin{bmatrix} \eta_0 \\ \eta_1 \\ \vdots \\ \eta_{N-1} \end{bmatrix} = \begin{bmatrix} h_0 & 0 & \cdots & \cdots & \cdots & 0 \\ h_1 & h_0 & \ddots & \ddots & & \vdots \\ \vdots & h_1 & \ddots & \ddots & & \vdots \\ h_{K-1} & \vdots & \ddots & \ddots & & \vdots \\ 0 & h_{K-1} & \ddots & \ddots & \ddots & 0 \\ \vdots & 0 & \ddots & \ddots & \ddots & h_0 \\ \vdots & \vdots & 0 & \ddots & \ddots & h_1 \\ \vdots & \vdots & & \ddots & 0 & \vdots \\ 0 & 0 & \cdots & \cdots & 0 & h_{K-1} \end{bmatrix} \odot \begin{bmatrix} x_0 \\ x_1 \\ \vdots \\ x_{L-1} \end{bmatrix} + \begin{bmatrix} \eta_0 \\ \eta_1 \\ \vdots \\ \eta_{N-1} \end{bmatrix},$$

where $[n_0, n_1, \ldots, n_{N-1}]^T$ indicates a white noise sequence.

In addition, a receive end performs corresponding decoding based on the known multiplexing waveform matrix H and the receive sequence r. A structural model of the receive sequence r is similar to that of a multiple-antenna receive sequence, and both are expressed as $r=HX+\eta$, where X indicates a to-be-transmitted sequence, $\eta$ indicates a white noise sequence, and r indicates a receive sequence. A difference lies in that a matrix H has different meanings: H indicates a channel parameter matrix in a multiple-antenna system, and indicates a multiplexing waveform matrix in the overlapped multiplexing system. In addition, a multiple-antenna detection algorithm includes a traditional detection algorithm, for example, a least square detection algorithm, a minimum mean square error detection algorithm, a maximum likelihood detection algorithm, a successive interference cancellation detection algorithm, or a QR decomposition algorithm. Because the two have similar structures, the detection algorithm may be used to correspondingly decode data in the overlapped multiplexing system.

In addition, the present disclosure mainly describes how to apply QR decomposition to data detection in the overlapped multiplexing system, and others are not described in detail herein.

First, QR decomposition is decomposing a matrix into a product of a unitary matrix and an upper triangular matrix. The QR algorithm simplifies a linear zero forcing algorithm and also improves algorithm stability. QR decomposition for the multiplexing waveform matrix H is as follows:

H=QR, where Q indicates an N×L unitary matrix and satisfies $Q^H Q = I_L$, and R indicates an L×L upper triangular matrix, as shown below:

$$R = \begin{bmatrix} R_{1,1} & R_{1,2} & \cdots & R_{1,L} \\ 0 & R_{2,2} & \cdots & R_{2,L} \\ 0 & 0 & \cdots & R_{3,L} \\ \vdots & \vdots & \vdots & \vdots \\ 0 & 0 & \cdots & R_{L,L} \end{bmatrix}$$

Compared with a traditional detection algorithm such as zero forcing detection, performing QR decomposition on the multiplexing waveform matrix H by using the QR decomposition algorithm can correspondingly reduce detection complexity. In addition, based on r=HX+N, the following formula may be obtained through simplification:

$$y = Q^H r$$

$$= Q^H(HX + N)$$
$$= Q^H(QRX + N)$$
$$= RX + \eta$$

In addition, another form may be further obtained based on the foregoing formula:

$$\begin{bmatrix} y_1 \\ y_2 \\ y_3 \\ \vdots \\ y_L \end{bmatrix} = \begin{bmatrix} R_{1,1} & R_{1,2} & \cdots & R_{1,L} \\ 0 & R_{2,2} & \cdots & R_{2,L} \\ 0 & 0 & \cdots & R_{3,L} \\ \vdots & \vdots & \vdots & \vdots \\ 0 & 0 & \cdots & R_{L,L} \end{bmatrix} \begin{bmatrix} x_1 \\ x_2 \\ x_3 \\ \vdots \\ x_L \end{bmatrix} + \begin{bmatrix} \eta_1 \\ \eta_2 \\ \eta_3 \\ \vdots \\ \eta_L \end{bmatrix}$$

Therefore, based on the foregoing descriptions, the $k^{th}$ element $y_k$ of a receive vector may be determined as follows:

$$y_k = R_{k,k} \cdot x_k + \eta_k + d_k,$$

where $d_k = \sum_{j=k+1}^{L} R_{k,j} \cdot x_j$, $d_k$ is independent of upper-layer signals $x_1, x_2, \ldots, x_{k-1}$, and a bottom-layer signal (the $L^{th}$ transmit antenna) can be first detected:

$$y_L = R_{L,L} \cdot x_L + \eta_L$$

Decision is performed based on the quantized decision factor:

$$\hat{x}_L = Q\left(\frac{y_L}{R_{L,L}}\right),$$

where $$Q\left(\frac{y_L}{R_{L,L}}\right)$$

indicates the quantized decision factor, $\hat{x}_L$ indicates the decision value of the bottom-layer element $y_L$, and $R_{L,L}$ indicates an element in a row L and a column L of the upper triangular matrix.

To detect a signal of a layer when $k=1, 2, \ldots, L$, it is first assumed that signals $\hat{x}_1, \hat{x}_2, \ldots, \hat{x}_{k-1}$ of the first k−1 layers have been correctly detected. In this case, a signal interference item $d_k$ is as follows:

$$\hat{d}_k = \sum_{j=k+1}^{L} R_{k,j} \cdot \hat{x}_j$$

Decision is performed based on the quantized decision factor:

$$\hat{x}_k = Q\left(\frac{y_k - \hat{d}_k}{R_{k,k}}\right),$$

where $$Q\left(\frac{y_k - \sum_{j=k+1}^{L} R_{k,j} \cdot \hat{x}_j}{R_{k,k}}\right)$$

indicates the quantized decision factor, $\hat{x}_k$ indicates the decision value of any non-bottom-layer element $y_k$, $R_{k,k}$ indicates an element in a row k and a column k of the upper triangular matrix, $R_{k,j}$ indicates an element in the row k and a column j of the upper triangular matrix, $\hat{x}_j$ indicates a decision value corresponding to an element $y_j$, and k=1, 2, . . . , L−1.

In addition, to better understand the technical solutions in the present disclosure, the following gives detailed description by using specific embodiments.

A decoding method in an existing overlapped multiplexing system is replaced with this detection algorithm, and a corresponding encoding process of the overlapped multiplexing system is as follows:

generating an envelope waveform in modulation domain based on a design parameter;

shifting the waveform in modulation domain based on a preset shift interval, to obtain shifted envelope waveforms in modulation domain; and writing the shifted envelope waveforms in a matrix form, and then multiplying the matrix by symbols in a to-be-modulated sequence, to obtain a complex modulated envelope waveform in modulation domain.

In addition, the following uses an OvTDM system as example, and specific processing steps of transmit-end encoding of the OvTDM system are as follows:

(1) First, design and generate a transmit signal envelope waveform h(t).

(2) Perform a specific time shift on the envelope waveform h(t) designed in (1), to form transmit signal envelope waveforms h(t−i×ΔT) of other moments.

(3) Write the envelope waveforms h(t−i×ΔT) in a form of a multiplexing waveform matrix H, and then multiply the matrix by a to-be-sent symbol vector x, to form a transmit signal waveform.

Figure 3:
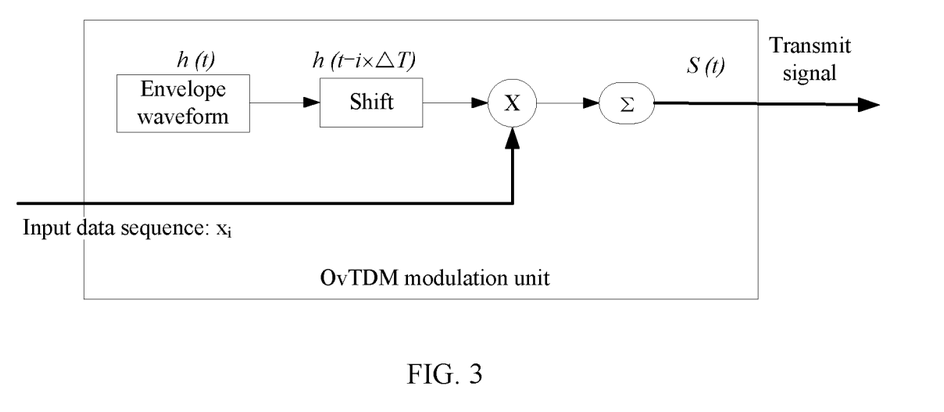
FIG. 3 is a block diagram of optional transmit-end encoding of an overlapped time division multiplexing system according to an embodiment of the present disclosure.
Figure 4:
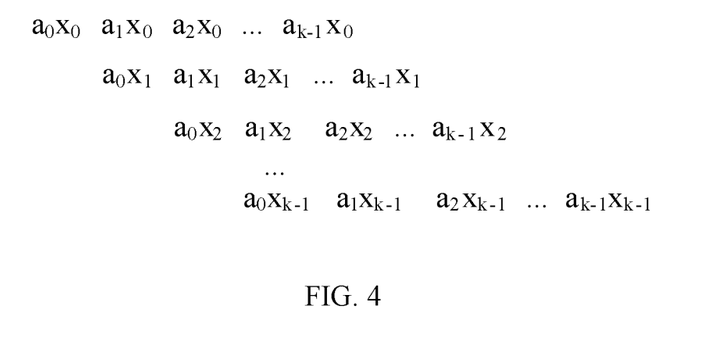
FIG. 4 shows an optional arrangement of K multiplexing waveforms of an overlapped time division multiplexing system according to an embodiment of the present disclosure.

A block diagram of the transmit-end encoding processing of the OvTDM system is shown in FIG. 3. An overlapped multiplexing method confirms to a parallelogram rule, as shown in FIG. 4.

In addition, using an OvFDM system as example, specific processing steps of transmit-end encoding of the OvTDM system are as follows:

(1) First, design and generate a spectrum signal H(f) of a transmit signal.

(2) Shift the spectrum signal H(f) designed in (1) based on a specific carrier spectrum spacing ΔB, to obtain other subcarrier spectrum waveforms ΔB whose spectrum spacing is H(f−i×ΔB).

(3) Write the spectrum waveforms H(f−i×ΔB) in a form of a matrix H, and then multiply the matrix by a to-be-sent symbol vector x, to form a spectrum S(f) of a complex modulated signal.

(4) Perform inverse discrete Fourier transformation on the spectrum of the complex modulation signal generated in (3), to finally form a time-domain complex modulated signal. A transmit signal may be expressed as follows:

$$\text{Signal}(t)_{TX} = \text{ifft}(S(f))$$

Figure 5:
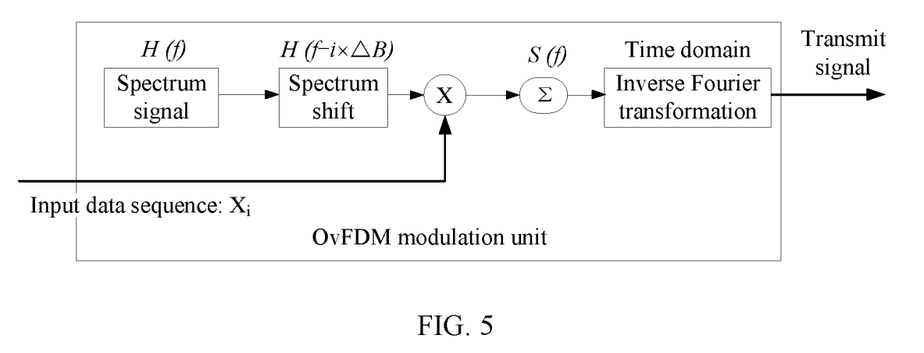
FIG. 5 is a block diagram of optional transmit-end encoding of an overlapped frequency division multiplexing system according to an embodiment of the present disclosure.
Figure 6:
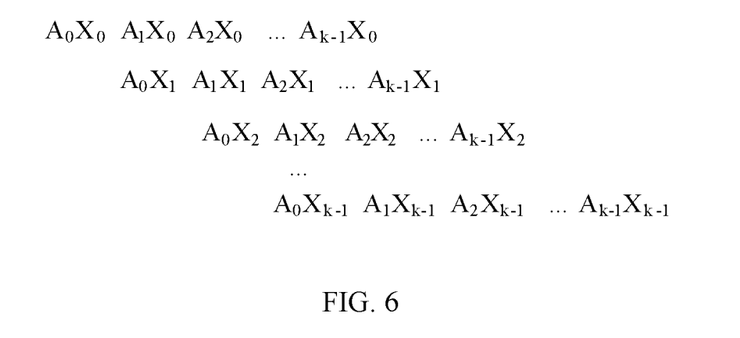
FIG. 6 shows an optional arrangement of K multiplexing waveforms of an overlapped frequency division multiplexing system according to an embodiment of the present disclosure.

A block diagram of the transmit-end encoding processing of the OvFDM system is shown in FIG. 5. An overlapped multiplexing method confirms to a parallelogram rule, as shown in FIG. 6.

In addition, a receive-end processing process of an overlapped multiplexing system is as follows:

performing preprocessing on a signal received by a receive end, to obtain a preprocessed signal; and performing signal detection on the preprocessed signal in a corresponding domain based on the foregoing QR decomposition-based detection algorithm, to obtain an input information flow, where the preprocessing process includes: performing synchronization, channel estimation, equalization processing, and the like on the signal received by the receive end.

Figure 7:
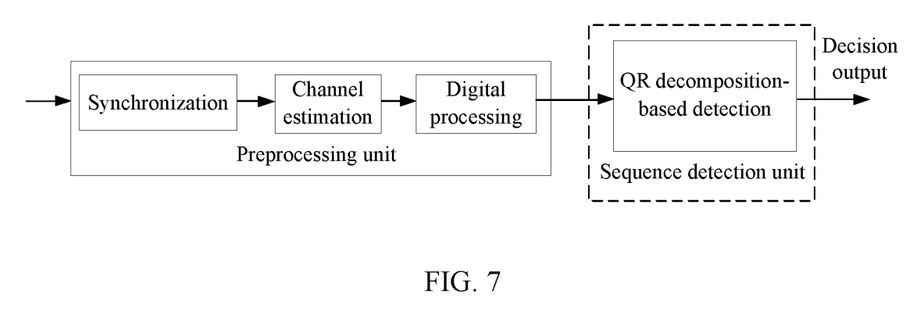
FIG. 7 is a block diagram of an optional receive end of an overlapped time division multiplexing system according to an embodiment of the present disclosure.

In addition, using the OvTDM system as an example, a receive-end processing process is shown in FIG. 7, and specific steps are as follows:

(1) First, synchronize received signals, including carrier synchronization, frame synchronization, symbol time synchronization, and the like.

(2) Perform corresponding detection on preprocessed data based on the foregoing detection algorithm.

Figure 8:
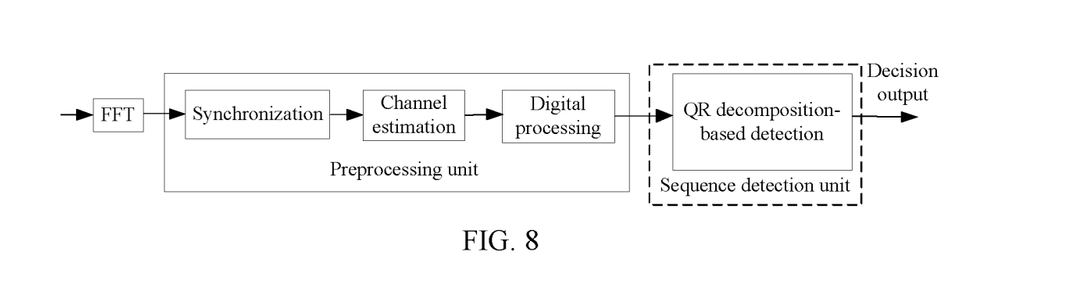
FIG. 8 is a block diagram of an optional receive end of an overlapped frequency division multiplexing system according to an embodiment of the present disclosure.

In addition, using the OvFDM system as an example, a receive-end processing process is shown in FIG. 8, and specific steps are as follows:

(1) First, perform a fast Fourier transformation (FFT) operation on a received signal, so that a time-domain signal is converted into a frequency-domain signal.

(2) Synchronize frequency-domain signals, including carrier synchronization, frame synchronization, symbol time synchronization, and the like.

(3) Perform corresponding detection on preprocessed data based on the foregoing detection algorithm.

According to an embodiment of the present disclosure, a QR decomposition-based detection apparatus is further provided. The QR decomposition-based detection apparatus is applied to an overlapped multiplexing system.

Figure 9:
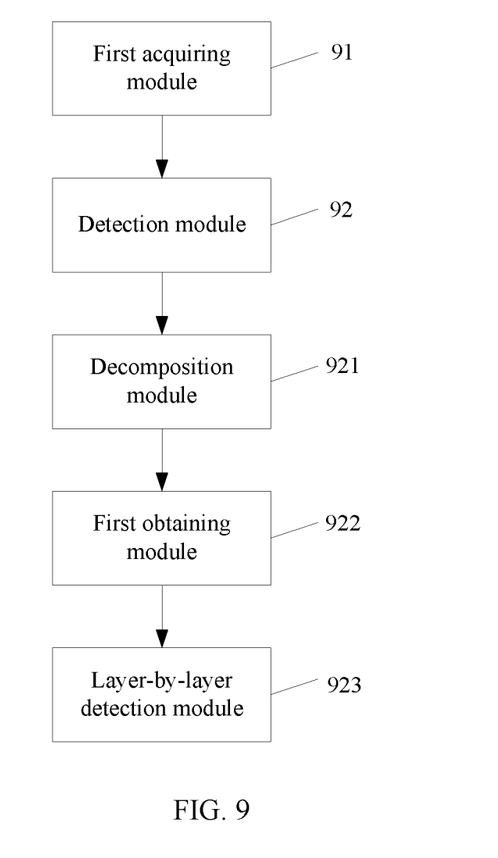
FIG. 9 is a block diagram of an optional QR decomposition-based detection apparatus according to an embodiment of the present disclosure.

As shown in FIG. 9, the QR decomposition-based detection apparatus according to this embodiment of the present disclosure includes: a first acquiring module 91, configured to: obtain a receive sequence, where the receive sequence is a sequence obtained by encoding and modulating an input signal based on a multiplexing waveform matrix and transmitting the signal through a Gaussian channel; and a detection module 92, configured to: detect the receive sequence by using a QR decomposition algorithm, where the detection module 92 includes: a decomposition module 921, configured to: decompose a foreknown multiplexing waveform matrix into a unitary matrix and an upper triangular matrix; a first obtaining module 922, configured to: perform matrix multiplication processing on the receive sequence based on the unitary matrix, to obtain a data sequence; and a layer-by-layer detection module 923, configured to: perform layer-by-layer detection on the data sequence based on the data sequence, the upper triangular matrix, and a quantized decision factor.

According to an embodiment of the present disclosure, the QR decomposition-based detection apparatus further includes: a second acquiring module (not shown), configured to: obtain the receive sequence, where the receive sequence is as follows: r=HX+η, where r indicates the receive sequence, H indicates the multiplexing waveform matrix, X indicates a to-be-sent sequence, and η indicates a Gaussian white noise sequence; and an obtaining submodule (not shown), configured to: perform matrix multiplication processing on the receive sequence based on the unitary matrix, to obtain the data sequence, where the data sequence is as follows:

$$y = RX + \eta',$$

where y indicates the data sequence, R indicates the upper triangular matrix, and η' indicates a Gaussian white noise sequence.

According to an embodiment of the present disclosure, the layer-by-layer detection module 923 includes: a definition module (not shown), configured to: define a plurality of elements $y_1, y_2, \ldots,$ and $y_L$ in the data sequence as multi-layer elements $y_1, y_2, \ldots,$ and $y_L$; a second obtaining module (not shown), configured to: obtain a decision value of the bottom-layer element $y_L$ based on the bottom-layer element $y_L$, the upper triangular matrix, and the quantized decision factor; and a third obtaining module (not shown), configured to: sequentially obtain decision values of non-bottom-layer elements $y_M, y_{M-1}, \ldots,$ and $y_1$ based on the non-bottom-layer elements $y_M, y_{M-1}, \ldots,$ and $y_1$, the upper triangular matrix, and the quantized decision factor, where M is less than L, and both L and M are positive integers.

According to an embodiment of the present disclosure, the decision value of the bottom-layer element $y_L$ is as follows:

$$\hat{x}_L = Q\left(\frac{y_L}{R_{L,L}}\right),$$

where $$Q\left(\frac{y_L}{R_{L,L}}\right)$$

indicates the quantized decision factor, $\hat{x}_L$ indicates the decision value of the bottom-layer element $y_L$, and $R_{L,L}$ indicates an element in a row L and a column L of the upper triangular matrix.

According to an embodiment of the present disclosure, a decision value of any non-bottom-layer element is as follows:

$$\hat{x}_k = Q\left(\frac{y_k - \sum_{j=k+1}^{L} R_{k,j} \cdot \hat{x}_j}{R_{k,k}}\right),$$

where $$Q\left(\frac{y_k - \sum_{j=k+1}^{L} R_{k,j} \cdot \hat{x}_j}{R_{k,k}}\right)$$

indicates the quantized decision factor, $\hat{x}_k$ indicates the decision value of any non-bottom-layer element $y_k$, $R_{k,k}$ indicates an element in a row k and a column k of the upper triangular matrix, $R_{k,j}$ indicates an element in the row k and a column j of the upper triangular matrix, $\hat{x}_1$ indicates a decision value corresponding to an element $y_j$, and $k=1, 2, \ldots, L-1$.

To sum up, according to the foregoing technical solutions in the present disclosure, transmission data is correspondingly decoded by using encoding characteristics of the overlapped multiplexing system and with reference to a QR decomposition-based detection method in a multiple-antenna system, thereby resolving problems in traditional decoding methods such as Viterbi, MAP, and Log-MAP decoding methods that a calculation amount is relatively large, complexity is relatively high, a relatively large storage capacity is required, and engineering implementation is difficult, and reducing decoding complexity of the OvXDM system.

The foregoing are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A QR decomposition-based detection method, wherein the QR decomposition-based detection method is applied to an overlapped multiplexing system, and the QR decomposition-based detection method comprises:
   step S1: obtaining, by a receive end of the overlapped multiplexing system, a receive sequence, wherein the receive sequence is a sequence obtained by encoding and modulating an input signal based on a multiplexing waveform matrix and transmitting the signal through a Gaussian channel; and
   step S2: detecting, by the receive end of the overlapped multiplexing system, the receive sequence by using a QR decomposition algorithm, wherein step S2 comprises:
   decomposing a foreknown multiplexing waveform matrix into a unitary matrix Q and an upper triangular matrix R;
   performing matrix multiplication processing on the receive sequence based on the unitary matrix Q, to obtain a data sequence;
   performing layer-by-layer detection on the data sequence based on the data sequence, the upper triangular matrix R, and a quantized decision factor; and
   decoding data based on the multiplexing waveform matrix and the receive sequence;
   wherein the QR decomposition-based detection method further comprises:
   obtaining the receive sequence, wherein the receive sequence is as follows:

$r=HX+\eta$, wherein r indicates the receive sequence, H indicates the multiplexing waveform matrix, X indicates a to-be-sent sequence, and $\eta$ indicates a Gaussian white noise sequence; and
   performing matrix multiplication processing on the receive sequence based on the unitary matrix Q, to obtain the data sequence, wherein the data sequence is as follows:

$y=RX+\eta'$, wherein y indicates the data sequence, R indicates the upper triangular matrix R, and $\eta'$ indicates a Gaussian white noise sequence;
   wherein the performing layer-by-layer detection on the data sequence based on the data sequence, the upper triangular matrix R, and a quantized decision factor comprises:
   defining a plurality of elements $y_1, y_2, \ldots,$ and $y_L$ in the data sequence as multi-layer elements $y_1, y_2, \ldots,$ and $y_L$;
   obtaining a decision value of the bottom-layer element $y_L$ based on the bottom-layer element $y_L$, the upper triangular matrix R, and the quantized decision factor; and
   sequentially obtaining decision values of non-bottom-layer elements $y_M, y_{M-1}, \ldots,$ and $y_1$ based on the non-bottom-layer elements $y_M, y_{M-1}, \ldots,$ and $y_1$, the upper triangular matrix R, and the quantized decision factor, wherein M is less than L, and both L and M are positive integers.

2. The QR decomposition-based detection method according to claim 1, wherein the decision value of the bottom-layer element $y_L$ is as follows:

$$\hat{x}_L = Q\left(\frac{y_L}{R_{L,L}}\right),$$

wherein $$Q\left(\frac{y_L}{R_{L,L}}\right)$$

indicates the quantized decision factor, $\hat{x}_L$ indicates the decision value of the bottom-layer element $y_L$, and $R_{L,L}$ indicates an element in a row L and a column L of the upper triangular matrix R.

3. The QR decomposition-based detection method according to claim 1, wherein a decision value of any non-bottom-layer element is as follows:

$$\hat{x}_k = Q\left(\frac{y_k - \sum_{j=k+1}^{L} R_{k,j} \cdot \hat{x}_j}{R_{k,k}}\right),$$

wherein $$Q\left(\frac{y_k - \sum_{j=k+1}^{L} R_{k,j} \cdot \hat{x}_j}{R_{k,k}}\right)$$

indicates the quantized decision factor, $\hat{x}_k$ indicates the decision value of any non-bottom-layer element $y_k$, $R_{k,k}$ indicates an element in a row k and a column k of the upper triangular matrix R, $R_{k,j}$ indicates an element in the row k and a column j of the upper triangular matrix R, $\hat{x}_j$ indicates a decision value corresponding to an element $y_j$, and k=1, 2, ..., L-1.

4. A QR decomposition-based detection apparatus, wherein the QR decomposition-based detection apparatus is applied to an overlapped multiplexing system, and the QR decomposition-based detection apparatus comprises:
 a first acquiring module, configured to: obtain a receive sequence, wherein the receive sequence is a sequence obtained by encoding and modulating an input signal based on a multiplexing waveform matrix and transmitting the signal through a Gaussian channel; and
 a detection module, configured to: detect the receive sequence by using a QR decomposition algorithm, wherein the detection module comprises:
 a decomposition module, configured to: decompose a foreknown multiplexing waveform matrix into a unitary matrix Q and an upper triangular matrix R;
 a first obtaining module, configured to: perform matrix multiplication processing on the receive sequence based on the unitary matrix Q, to obtain a data sequence;
 a layer-by-layer detection module, configured to: perform layer-by-layer detection on the data sequence based on the data sequence, the upper triangular matrix R, and a quantized decision factor; and
wherein the QR decomposition-based detection apparatus is configured to decode data based on the multiplexing waveform matrix and the receive sequence;
wherein the QR decomposition-based detection apparatus further comprises:
 a second acquiring module, configured to: obtain the receive sequence, wherein the receive sequence is as follows:

$$r = HX + \eta,$$

wherein r indicates the receive sequence, H indicates the multiplexing waveform matrix, X indicates a to-be-sent sequence, and $\eta$ indicates a Gaussian white noise sequence; and
 an obtaining submodule, configured to: perform matrix multiplication processing on the receive sequence based on the unitary matrix Q, to obtain the data sequence, wherein the data sequence is as follows:

$$y = RX + \eta',$$

wherein y indicates the data sequence, R indicates the upper triangular matrix R, and $\eta'$ indicates a Gaussian white noise sequence;
wherein the layer-by-layer detection module comprises:
 a definition module, configured to: define a plurality of elements $y_1, y_2, \ldots,$ and $y_L$ in the data sequence as multi-layer elements $y_1, y_2, \ldots,$ and $y_L$;
 a second obtaining module, configured to: obtain a decision value of the bottom-layer element $y_L$ based on the bottom-layer element $y_L$, the upper triangular matrix R, and the quantized decision factor; and
 a third obtaining module, configured to: sequentially obtaining decision values of non-bottom-layer elements $y_M, y_{M-1}, \ldots,$ and $y_1$ based on the non-bottom-layer elements $y_M, y_{M-1}, \ldots,$ and $y_1$, the upper triangular matrix R, and the quantized decision factor, wherein M is less than L, and both L and M are positive integers.

5. The QR decomposition-based detection apparatus according to claim 4, wherein the decision value of the bottom-layer element $y_L$ is as follows:

$$\hat{x}_L = Q\left(\frac{y_L}{R_{L,L}}\right),$$

wherein $$Q\left(\frac{y_L}{R_{L,L}}\right)$$

indicates the quantized decision factor, $\hat{x}_L$ indicates the decision value of the bottom-layer element $y_L$, and $R_{L,L}$ indicates an element in a row L and a column L of the upper triangular matrix R.

6. The QR decomposition-based detection apparatus according to claim 4, wherein a decision value of any non-bottom-layer element is as follows:

$$\hat{x}_k = Q\left(\frac{y_k - \sum_{j=k+1}^{L} R_{k,j} \cdot \hat{x}_j}{R_{k,k}}\right),$$

wherein $$Q\left(\frac{y_k - \sum_{j=k+1}^{L} R_{k,j} \cdot \hat{x}_j}{R_{k,k}}\right)$$

indicates the quantized decision factor, $\hat{x}_k$ indicates the decision value of any non-bottom-layer element $y_k$, $R_{k,k}$ indicates an element in a row k and a column k of the upper triangular matrix $R_{k,j}$ indicates an element in the row k and a column j of the upper triangular matrix, $\hat{x}_j$ indicates a decision value corresponding to an element $y_j$, and k=1, 2, ..., L−1.

* * * * *